Figure 1:
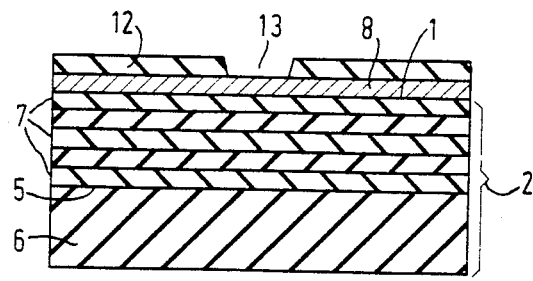

United States Patent [19]

Nicia et al.

[11] Patent Number: 4,610,502
[45] Date of Patent: Sep. 9, 1986

[54] METHOD OF MANUFACTURING A GEODETIC COMPONENT AND INTEGRATED OPTICAL DEVICE COMPRISING SAID COMPONENT

[75] Inventors: Antonius J. A. Nicia; Giok D. Khoe, both of Eindhoven, Netherlands

[73] Assignee: U.S. Philips Corporation, New York, N.Y.

[21] Appl. No.: 670,783

[22] Filed: Nov. 13, 1984

[30] Foreign Application Priority Data

Nov. 15, 1983 [NL] Netherlands .......................... 8303905

[51] Int. Cl.⁴ .......................... G02B 6/10; B44C 1/22; C03C 15/00; C03C 25/06
[52] U.S. Cl. ..................... 350/96.12; 156/653; 156/656; 156/657; 156/659.1; 427/93; 427/94; 430/321; 430/318; 430/317

[58] Field of Search ............... 156/653, 654, 655, 656, 156/657, 659.1, 662, 663; 430/313, 317, 318, 321–323; 427/38, 39, 93, 94; 350/96.1, 96.11, 96.12, 96.13, 320; 65/3.11, 3.12

[56] References Cited

U.S. PATENT DOCUMENTS

| | | | |
|---|---|---|---|
| 3,542,453 | 11/1970 | Kantor | 156/655 X |
| 3,666,548 | 5/1972 | Brack et al. | 156/643 X |
| 3,769,109 | 10/1973 | MacRae et al. | 156/655 X |
| 4,294,507 | 10/1981 | Johnson | 350/96.12 X |
| 4,461,672 | 7/1984 | Musser | 156/662 X |

Primary Examiner—William A. Powell
Attorney, Agent, or Firm—Paul R. Miller

[57] ABSTRACT

A method of manufacturing a geodetic-optical component is described in which non-spherical rotationally symmetrical recesses are formed in a surface of a substrate, and the surface with the recesses are covered with a planar waveguide. This technique forms the recesses in a laminated substrate having a number of layers of varying etching rates, and then etching these layers to form cup-shaped recesses.

8 Claims, 4 Drawing Figures

METHOD OF MANUFACTURING A GEODETIC COMPONENT AND INTEGRATED OPTICAL DEVICE COMPRISING SAID COMPONENT

The invention relates to a method of manufacturing a geodetic-optical component in which non-spherical rotationally symmetrical recesses are formed in a surface of a substrate and the surface with the recesses is provided with a planar waveguide.

In geodetic-optical components incident light rays are captured in a planar waveguide which is provided on a substrate having non-spherical rotationally symmetrical undulations, for example, recesses in its surface. In this manner, for example, lenses can be made. The dimensions of the recesses in the substrate are prescribed precisely. The shape accuracy is approximately 0.5 $\mu$m.

According to a known method the recesses are obtained by compressing or moulding glass in a mould having a surface which is the negative of the substrate surface to be obtained.

It is difficult to manufacture compression or moulding jigs with the required precision.

Further it is difficult to shape molten glass with a compression or moulding jig with the required precision for this purpose.

Because of these problems, geodetic-optical components have not yet been used in optics on a significant scale.

An object of the invention is to stimulate the use of geodetic-optical components. The invention is inter alia based on the recognition of the fact that the identified problems can be avoided at least to a considerable extent when chemical techniques are used in shaping the recesses.

According to the invention the method described in the opening paragraph is therefore characterized in that a surface of a support body is provided with a number of substantially equally thick layers which together with the support body form a laminated substrate with the layers having such a composition that upon etching with a given etchant the etching rate varies in accordance with the serial number of forming the layers, that the surface of the laminated substrate is screened by means of a masking layer which can withstand the action of the etchant with the surface of the laminated substrate being exposed on the side of the layers at the area of the recesses to be formed, and the recesses being formed by etching by means of the etchant with the masking layer being removed and a planar waveguide being provided.

The etching rate preferably decreases with increasing serial number of forming the layers.

Recesses of the required precision can be formed in the substrate surface by means of the method according to the invention. An economically justified manufacture of geodetic-optical components is hereby obtained. Optical devices in which such components are integrated can now also be made.

Figure 2:
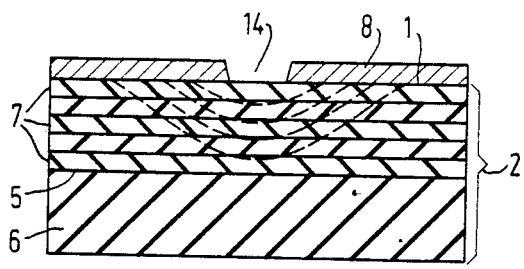
Figure 3:
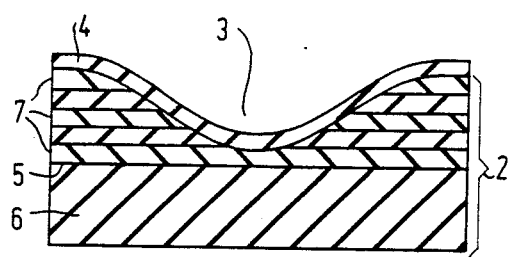
Figure 4:
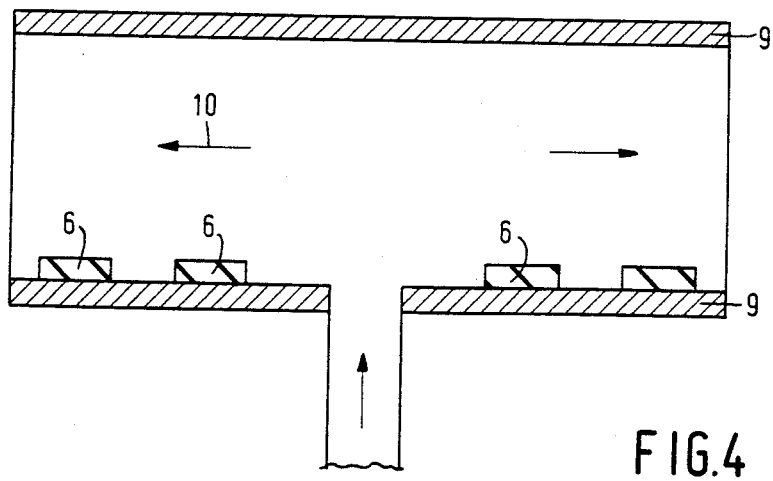

The invention will now be described in greater detail with reference to an embodiment and the accompanying drawing, in which:

FIGS. 1, 2 and 3 show diagrammatically a part of a cross-section of a geodetic-optical component in successive stages of the manufacture by means of the method according to the invention, and FIG. 4 is a diagrammatic sectional view of a device for carrying out the method according to the invention.

In the method to be described by way of example a geodetic-optical component is manufactured in which nonspherical rotationally symmetrical recesses 3 are formed in a surface 1 of a laminated substrate 2 and the surface 1 with the recesses 3 are provided with a planar waveguide 4.

According to the invention a surface 5 of a substrate body 6 is provided with a number of substantially equally thick layers 7 which together with the support body 6 constitute the laminated substrate 2 with the layers 7 having such a composition that upon etching by means of an etchant the etching rate varies in accordance with the serial number of forming the layers.

The surface 1 of the laminated substrate 2 is then screened by means of a masking layer 8 which can withstand the action of the etchant with the surface 1 of the laminated substrate 2 being exposed on the side of the layers at the area of the recesses 3 to be formed (see FIG. 2).

The recesses 3 are then obtained by etching by means of the etchant and after removing the masking layer 8 the planar waveguide 4 is provided.

The etching rate preferably decreases with increasing serial number of forming the layers.

In the manufacture of the geodetic-optical component, in our example a lens, there is used, for example, a support body 6 a few centimeters long and wide and consisting of quartz glass. The support body 6 is provided in a box-like reactor having capacitively coupled plates 9 between which an RF field having a frequency of 13 MHz is generated.

The layers 7 are deposited on the support body 6 from a gaseous phase by means of a non-isothermal plasma CVD method. A non-isothermal plasma CVD method is to be understood to mean a method in which a so-called cold plasma is used in which only electrons have a high kinetic energy. Even gas mixtures which thermally are not reactive can be made to react with such a plasma. Comparatively low substrate temperatures (60°–80° C.) can successfully be used in this method and crack-free layers are obtained.

During the deposition of the layers 7 the support bodies 6 are at a temperature of approximately 60° C. The layers 7 are deposited from a gas flow 10 which comprises silane ($SiH_4$), ammonia ($NH_3$), argon (Ar) and stepwise-decreasing quantities of dinitrogen oxide ($N_2O$). The composition of the gaseous phase is varied in a usual manner discontinuously and with short intervals in such manner that approximately 1000 layers, each approximately 1 $\mu$m thick, are deposited within a few hours at a pressure of 1–5 Torr.

The layers vary in substantially equal steps of composition as a result of which cup-shaped recessed 3 are obtained in the etching treatment to be carried out subsequently.

The surface 1 of the laminated substrate 2 thus obtained is provided with a 0.2 $\mu$m thick chromium layer 8 masking against the etchant, and a layer 12 of photolacquer. The layer 12 of photolacquer is exposed and developed according to the required pattern. The pattern corresponds to the required recesses 3. By the circular apertures 13 (diameter 10 $\mu$m) in the layer 12 of photolacquer obtained in this manner, apertures 14 of approximately the same diameter are etched in the chromium layer 8 in the usual manner at the area where the recesses 3 are to be formed.

The layer 12 of photolacquer is removed and the recesses 3 are etched in the chromium layer 8 via the apertures 14 by means of the etchant which consists of phosphoric acid. Cup-shaped recesses are formed in a few days. They are approximately 600 μm deep and have a diameter at the surface 1 of approximately 2 mm.

After removing the masking layer 8 the planar waveguide 4 is provided in the form of a 50 μm thick layer of a material having a higher refractive index than the material of the substrate, for example silicon nitride, after a 10 μm thick optical buffer layer of silicon dioxide has first been provided.

The lens obtained in this manner is finished in any usual manner, optionally integrated with other components in an optical device.

Of course the invention is not restricted to the example described. The method described by way of example may be varied in many manners by those skilled in the art without departing from the scope of this invention.

What is claimed is:

1. A method of manufacturing a geodetic-optical component having non-spherical rotationally symmetrical recesses comprising the steps of
   applying a number of substantially equally thick layers onto a surface of a support body, said support body and said layers forming a laminated substrate,
   forming a masking layer on said laminated substrate with openings at selected recess locations,
   etching said laminated substrate through said openings with an etchant having an etching rate varying with the number of said layers to form said non-spherical rotationally symmetrical recesses, and
   providing a planar waveguide on said recesses after removing said masking layer.

2. A method according to claim 1, wherein said etching rate decreases with increasing number of said layers.

3. A method according to claim 1 or claim 2, wherein said layers are formed by using a non-isothermal plasma CVD technique.

4. A method according to claim 1 or claim 2, wherein said etchant consists of phosphoric acid.

5. A method according to claim 1 or claim 2, wherein said recesses are cup-shaped.

6. An optical device comprising a laminated structure of a number of substantially equally thick layers on a surface of a support body, at least one non-spherical rotationally symmetrical recess in said laminated structure, and a plasma waveguide on said recess.

7. An optical device according to claim 6, wherein said recess is cup-shaped.

8. An optical device according to claim 6 or claim 11, wherein said planar waveguide is a 50 μm thick layer of a material having a higher refractive index than said laminated structure.

* * * * *